United States Patent

[11] 3,561,511

| [72] | Inventor | Charles K. Kummer |
| | | St. Louis, Mo. |
| [21] | Appl. No. | 803,017 |
| [22] | Filed | Feb. 27, 1969 |
| [45] | Patented | Feb. 9, 1971 |
| [73] | Assignee | Ralston Purina Company |
| | | St. Louis, Mo. |
| | | a corporation of Missouri |

[54] EGG SLICER
1 Claim, 3 Drawing Figs.

| [52] | U.S. Cl. | 146/2, 146/139 |
| [51] | Int. Cl. | B26d 4/08 |
| [50] | Field of Search | 146/2.1, 139 |

[56] References Cited
UNITED STATES PATENTS

| 1,317,430 | 9/1919 | Clarke | 146/139 |
| 2,436,982 | 3/1948 | Turnquist | 146/2(X) |
| 2,592,657 | 4/1952 | Cierley | 146/2X |

Primary Examiner—Willie G. Abercrombie
Attorney—Robert W. Brukardt and Lawrence J. Hurst ABSTRACT: A device for slicing a cooked egg roll is provided with slicing wires arranged for presentation to the egg roll in such a manner that slices less than three-sixteenths of an inch may be obtained without destruction or crumbling of the egg product. The slicing wires are provided in a plane predominantly spaced from the pivot point of the cutting wires such that when the wires are presented to the egg roll, they pass therethrough with a slicing action. This slicing action permits the egg roll to be sliced closer than three-sixteenths of an inch without deformation, crumbling or squashing of the egg roll.

INVENTOR
CHARLES K. KUMMER
BY
*Lawrence J. Hurst*
ATTORNEY

INVENTOR
CHARLES K. KUMMER
BY
Lawrence J. Hurst
ATTORNEY

EGG SLICER

BACKGROUND OF THE INVENTION

Egg slicers which utilize wires predeterminantly spaced apart for affecting the cutting of a hard boiled egg are well known in the art. Primarily, these prior art devices were utilized in conjunction with slicing an individual hard boiled egg. Due to the nature of an egg being relatively small in size, the wires could be presented to the egg from a straight pivot or thrust position to accomplish the slicing action. In addition, the wires of such slicers were spaced apart a sufficient distance to enable the egg to be deformed before penetration of the wires without deleteriously affecting the resulting egg slices. Thus, the wires were forced through the egg to obtain unitary slices.

These prior art devices were unsatisfactory in slicing egg rolls. These egg rolls, which are now being manufactured, consist of a coagulated elongated yolk rod surrounded by coagulated albumen and have a length of 12 inches or more. When these egg rolls are sliced, the resultant egg slices may be used as hard boiled egg slices would be used. However, when these egg rolls are subjected to the prior art egg slicing devices, the deformation of the egg rolls resulting from this straight pivot or thrust produced unsatisfactory egg slices. In addition, it was discovered that placing the wires close together or approximately 0.16 inches apart resulted in a pressure exerted by the numerous wires sufficient to squash an egg roll.

To eliminate these aforementioned problems and facilitate the slicing of egg rolls by institutions such as restaurants, applicant has discovered that by offsetting the plane of the wires from the pivot point a predetermined distance an egg roll may be sliced without the aforementioned deleterious effects. By placing the slicing wires in a plane a predetermined distance from the pivot point of said wires, they are passed through an egg roll with a slicing action rather than a straight thrust. Further, the presentation of the wires to the egg roll with a slicing action enables the egg roll to be sectioned into slices less than approximately three-sixteenths of an inch and preferably approximately 0.16 inches.

It is therefore the general object of the present invention to provide a simplified egg slicer capable of providing uniform egg slices from an egg roll.

It is another object of the present invention to provide an egg slicer having cutting wires in a plane predeterminantly spaced from the pivot point of said cutting wires such that they are presented to an egg roll in a slicing fashion.

Another object of the present invention is to provide an egg slicer which permits an egg roll to be sliced smaller than approximately three-sixteenths of an inch and preferably approximately 0.16 inches.

Another object of the present invention is to provide an egg roll slicer capable of receiving egg rolls of various lengths.

These and other objects and advantages of the present invention will become more apparent by the description herein.

Briefly, the present invention comprises a device for cutting an egg roll into slices, having a base member adapted to receive an egg roll, a slicing member pivotally connected to said base member and having a plurality of wires maintained in a plane a predetermined distance from said pivot, whereby said wires are passed through an egg roll with a slicing action when the slicing member is moved toward the base member.

DESCRIPTION OF THE DRAWINGS

In the drawings which illustrate embodiments of the present invention.

DESCRIPTION OF THE PREFERRED EMBODIMENT

Figure 2:
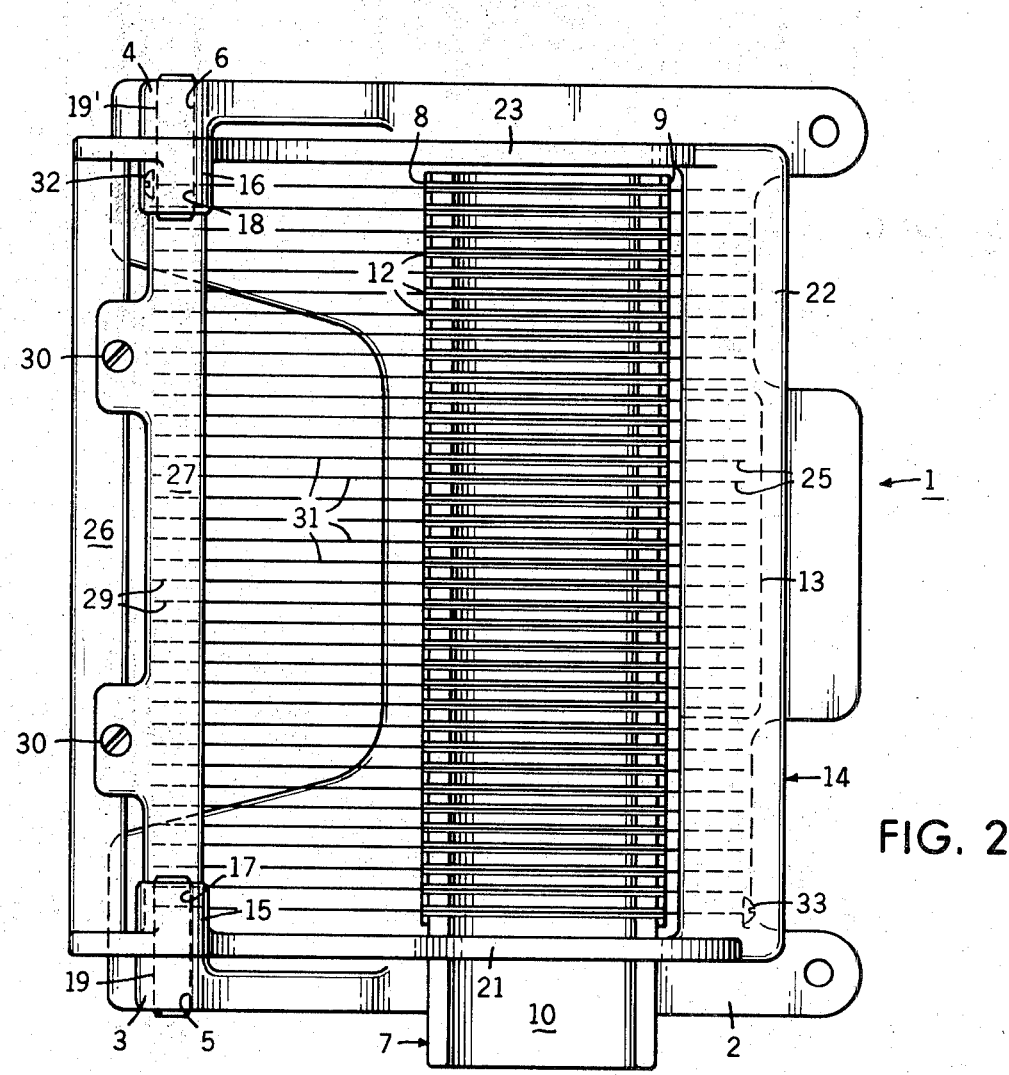
FIG. 2 is a top view of the egg slicer of FIG. 1.
Figure 1:
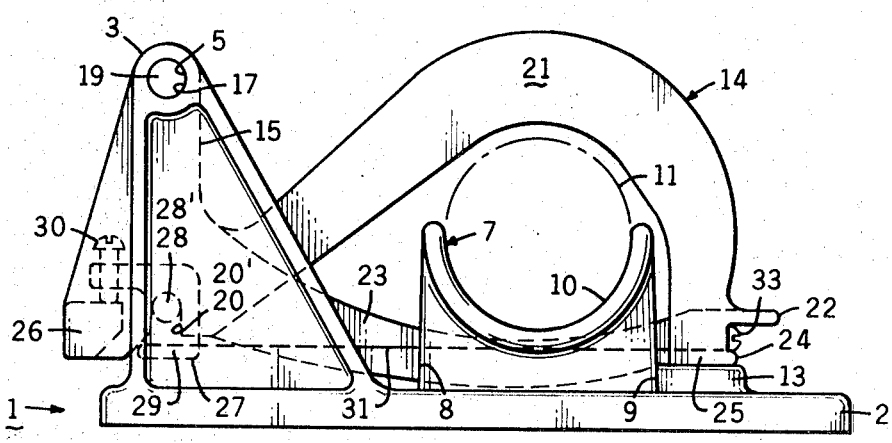
FIG. 1 is a side view of the egg slicer embodying the present invention.
Figure 3:
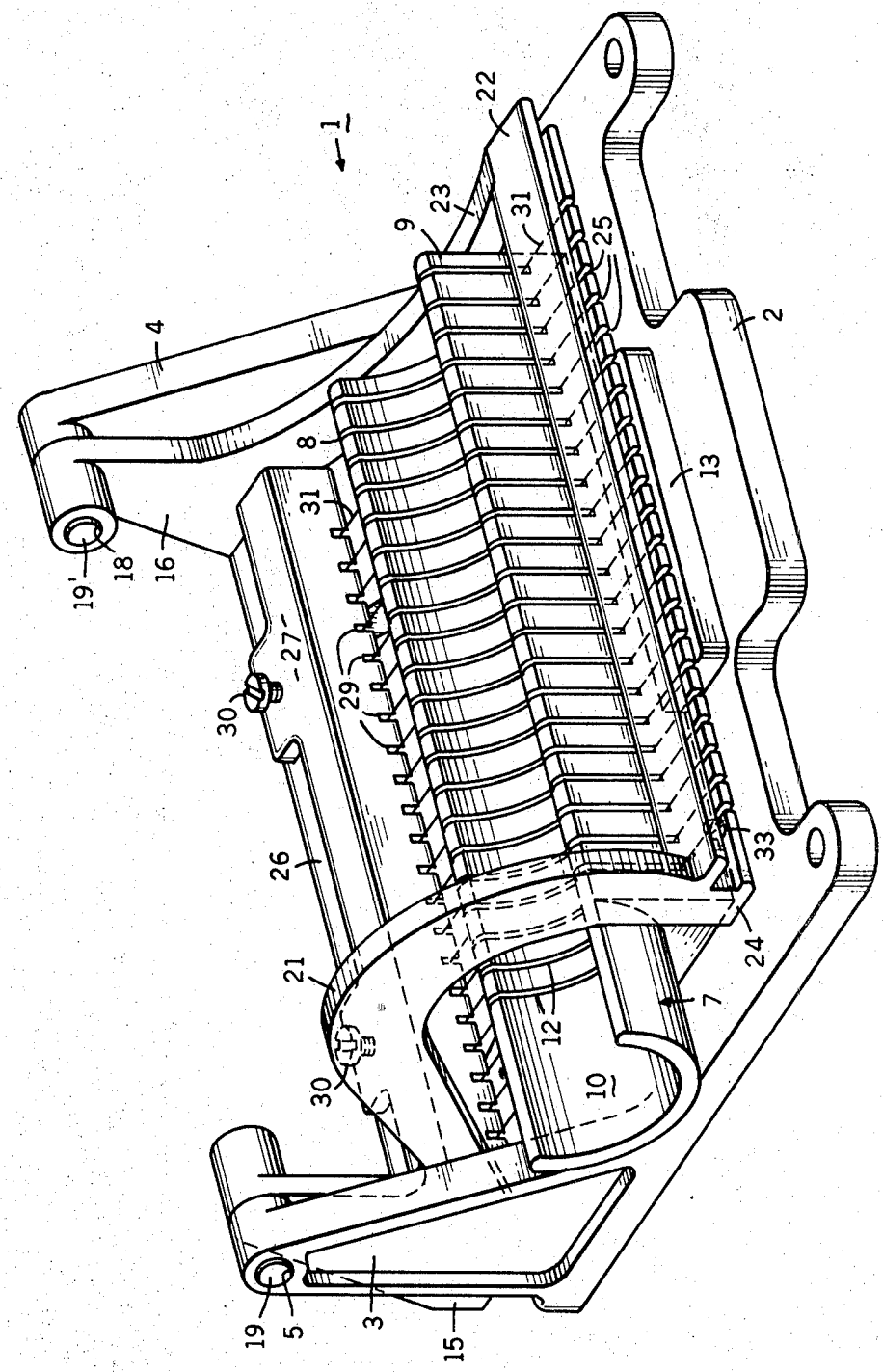
FIG. 3 is an isometric view of the egg slicer of FIG. 1.

Referring now to FIGS. 1, 2 and 3, the egg slicer 1 is provided with a base or frame 2 having a pair of vertically extending arm portions 3 and 4. Each of the arm portions 3 and 4 is provided with an aperture 5, 6 adjacent to the uppermost portion thereof. The base 2 is also provided with an egg roll receiving portion or holding member 7 having vertically extending sides 8, 9 and an interior concave contour 10 adapted to receive an egg roll, indicated generally at 11. The egg roll receiving portion 7 is provided with a plurality of slots or grooves 12 therein, which are preferably equally spaced. A boss or abutment member 13 is provided on the frame 2 adjacent to the egg roll receiving portion 7.

A cutting member, indicated generally at 14, is provided with a pair of arms 15 and 16 having apertures 17, 18 therein adjacent to one end thereof. Pins or rods 19, 19' are provided with a press fit through the apertures 5, 17 and 6, 18 such that the cutting member 14 is pivotally connected to the frame 2. The other end of the arms 15 and 16 are provided with slots 20 and 20'. The other end of the arm 15 is provided with a formed portion 21 having a shape such that when an egg roll 11 is located on the holding member 7, the end of said roll may extend past the cutting member 14 without interference. This enables egg rolls of various lengths to be accommodated by the slicer 1. In addition, the other end of the arm 16 is connected to the handle or bar 22 by the formed portion 23. The formed portion 23 has a shape which enables the operator to slide the egg slices off of the holding member 7 without interference from the cutting member 14 when said cutting member is in its downward or cutting position. The front lip 24 of the cutting member 14 is provided with a plurality of slots 25 which are spaced the same distance apart as the slots 12 of the egg roll receiving member 7. In addition, it should be noted that the arms 15 and 16 are connected by a formed portion 26 on the cutting member 14.

A tension bar 27 having pins 28, 28' on the opposite ends thereof is provided with a press fit into the slots 20 and 20'. A portion of the bar 27 is provided with slots or grooves 29 which are in registry with the slots 25 in the lip 24. Screws or bolts 30 are provided through the tension bar 27 and engage the formed portion 26 on the cutting member 14 for properly locating said bar and maintaining the alignment between the slots 29 and the slots 25. The slicing wire 31 is strung through the slots 29 and 25 and said wire is maintained in position by means of the screw 32 on the tension bar 27 and the screw 33 on the lip portion 24 of the cutting member 14. It should be noted that with the cutting wire 31 positioned between the lip 24 and tension bar 27 on the cutting member 14, said wire takes the form of a plurality of slicing wires equidistantly spaced apart. Also, it should be noted that the plane of the wires 31 is maintained a predetermined distance from the pivot rods 19, 19'.

In the operation of the slicer 1, an egg roll 11 is placed in the holding member 7 when the cutting member 14 is in its raised position. The cutting member 14 is then pulled downwardly by the operator pressing on the handle 22 to pivot about the rods 19, 19'. Due to the shape of the cutting member 14, the tension bar 27 and wires 31 are moved downward and leftwardly, as viewed in FIG. 1. Therefore, by maintaining the plane of the wires 31 spaced a predetermined distance from the pivot point of the cutting member 14, said wires pass through the egg roll 11 with a movement simulating a slicing action. This slicing action permits the egg roll to be sliced into thin strips without a squashing of the egg roll. It should be understood that the degree of deformation of the egg roll 11 when the wires 31 are initially presented thereto is not sufficient to deleteriously effect the egg roll, but, rather, the slicing action allows easy penetration and passage through the egg roll 11. Further, it should be noted that when the cutting member 14 is in its downward position, engaging the boss 13, the wires 31 are located beneath the holding member 7 such that the cuts made by said wires are completely through the egg roll.

From the foregoing it is now apparent that a novel egg slicing device meeting the objects and advantages heretofore set forth has been described and that modifications or changes as to the precise configurations, shapes and details of construction set forth by way of illustration may be made by those

I claim:

1. A device for cutting an egg roll into slices comprising a base member, said base member including a portion adapted to receive an egg roll, said egg roll receiving portion having a plurality of predeterminantly spaced slots therein, a slicing member pivotably connected to said frame, a plurality of wires on said slicing member predeterminantly spaced apart a distance in the range of approximately .16 to three-sixteenths inches for registry with said slots, the plane of said wires being maintained a predetermined distance from the pivot connection of said slicing member to said base member, said slicing member having one side thereof adapted to extend over an end of an egg roll which extends beyond said egg roll receiving portion to permit the slicing of the egg roll without interference and the other side of said slicing member having a shape which permits removal of the egg slices from said egg roll receiving portion when said slicing member is in the lowered position, said slicing member being movable between a raised position permitting an egg roll to be inserted on said egg roll receiving portion and a lowered position having said wires in registry with said slots, said wires being passed through an egg roll with a slicing action due to the plane of said wires being maintained the predetermined distance from the pivot connection to cut said egg roll into slices when said slicing member moves from the raised to the lowered position.